Mar. 3, 1925.
L. MAILMAN
DRIP PAN ALARM
Filed Oct. 6, 1924
1,528,737
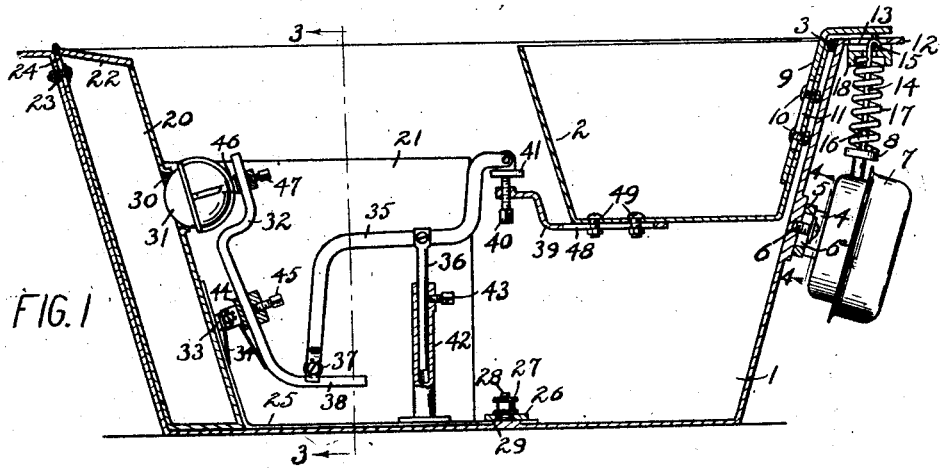
FIG.1
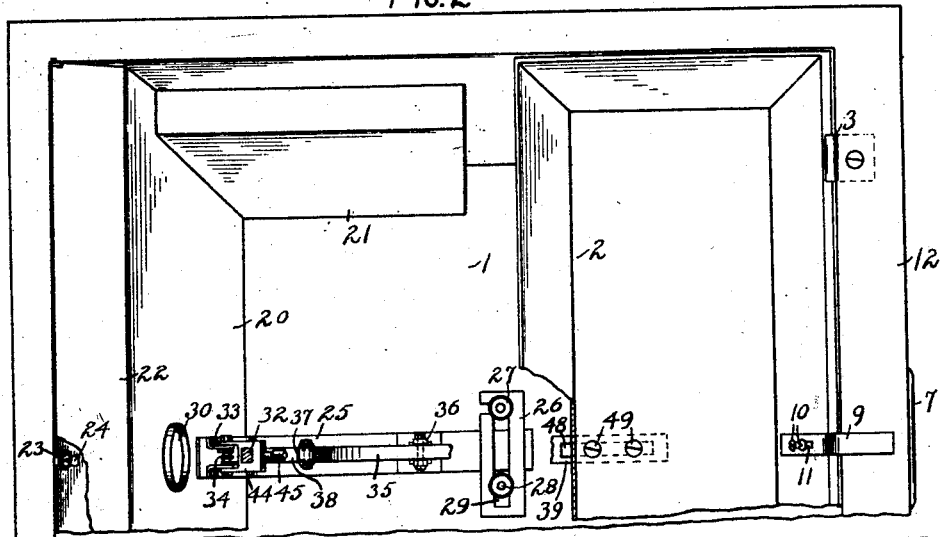
FIG.2
FIG.3
FIG.4
INVENTOR
LOUIS MAILMAN
BY
R. W. Smith
ATTORNEY.

Patented Mar. 3, 1925.

1,528,737

UNITED STATES PATENT OFFICE.

LOUIS MAILMAN, OF LOS ANGELES, CALIFORNIA.

DRIP-PAN ALARM.

Application filed October 6, 1924. Serial No. 741,902.

*To all whom it may concern:*

Be it known that I, LOUIS MAILMAN, a citizen of the United States, residing at Los Angeles, in the county of Los Angeles and State of California, have invented certain new and useful Improvements in Drip-Pan Alarms, of which the following is a specification.

This invention is a drip pan alarm comprising an audible signal adapted to be sounded when the liquid in the pan reaches a predetermined level, and also including an auxiliary chamber adapted to receive a portion of the liquid after sounding of the alarm, and thereby prevent overflow if the pan is not promptly emptied.

It is the object of the invention to provide a float control for the audible signal having means for adjusting the operating mechanism so as to regulate the level at which the alarm will be sounded.

It is a further object of the invention to provide for detachably mounting the auxiliary chamber in the drip pan, so that if desired, the signal mechanism may be used without said auxiliary chamber.

It is a still further object of the invention to provide for adjusting the control mechanism of the auxiliary chamber, so that the latter may be operatively connected to the float mechanism when used in drip pans of various size.

The invention will be readily understood from the following description of the accompanying drawings, in which:

Fig. 1 is a vertical section through a drip pan constructed in accordance with the invention.

Fig. 2 is a fragmentary plan view of the same.

Fig. 3 is a section on the line 3—3 of Fig. 1.

Fig. 4 is a detail section on the line 4—4 of Fig. 1.

The drip pan 1 has a float 2 hinged thereto at its upper edge as shown at 3, said float swinging downwardly into the pan to the position shown in Fig. 1, when the level of the liquid in the pan is below the float.

A spring gong 7 is mounted on the outer side of the wall of the drip pan and is released for sounding the same by depressing the push button 8. The gong is preferably vertically adjustable relative to the drip pan, and for this purpose the support 4 of the gong is fixed to a base 5 which is received against the side wall of the pan and held in adjusted position by screws 6 received through vertical slots 6ª in said base.

An operating connection between float 2 and the push button 8 is illustrated as comprising an arm 9 fixed to the float and adapted for vertical adjustment thereon by screws 10 received through a slot 11 in said arm. The end of the arm projects from the float over the rim 12 of the drip pan and overlies an aperture 13 provided in said rim above the gong 7.

The end of arm 9 and push button 8 are connected by a rod 14 which is secured to eyes 15 and 16 depending from the arm through aperture 13 and mounted on said push button respectively, the connecting rod holding the push button in position to prevent sounding of the gong as long as float 2 is swung downwardly into the drip pan.

When the float is swung upwardly by the rise of the liquid level in the drip pan, the pull exerted through rod 14 on push button 8 is released, and said push button is depressed by a spring 17 so as to sound the gong.

Spring 17 is preferably a coil spring received around rod 14 with one end thereof abutting against push button 8 and its opposite end received in and abutting against an annular guide 18 which depends from rim 12 around aperture 13.

An auxiliary chamber which is adapted to receive a portion of the liquid from the drip pan after the alarm is sounded, is illustrated as comprising a relatively flat casing 20 mounted on the inside of the wall of the pan opposite float 2, said casing preferably having extensions 21 extending across the drip pan from the ends of the casing so as to increase the capacity of the auxiliary chamber.

The extensions 21 are preferably closed at the tops thereof, while the top of casing 20 is provided with a hinged cover 22 adapted to swing open when the drip pan is tilted, in order to empty the liquid from the auxiliary chamber as well as the pan.

The auxiliary chamber is detachably mounted in the drip pan, as for example, by a bolt 23 extending through the wall of the pan adjacent its upper edge, and received in a vertical slot 24 provided in the wall of casing 20; and an arm 25 projecting from the base of casing 20 across the bottom of the drip pan and secured thereto by a clamping strip 26.

The clamping strip may be removably secured to the bottom of the drip pan by thumb nuts 27 threaded on studs 28 which project through a slot 29 in said strip. One end of the slot 29 preferably opens through the side of the clamping strip to permit ready disengagement of the latter from studs 28, when it is desired to remove the auxiliary liquid chamber.

An intake port 30 is provided in casing 20, said port being normally closed, but adapted to be opened by a rise in the liquid level in the drip pan causing movement of float 2 for sounding the gong 4. When the port is opened the liquid in the drip pan flows therethrough into the auxiliary chamber so as to lower the level of the liquid in the pan and thereby prevent overflow if the pan is not promptly emptied.

The port 30 may be controlled by a ball valve 31 mounted on a lever 32, which is pivoted on a bracket 33 and provided with a spring 34 tending to swing said lever so as to close the valve. A rocker arm 35 is pivoted on a bracket 36, and is provided with a roller 37 at one end thereof adapted to engage the offset end 38 of the valve lever, so as to swing the lever against the action of its spring and open valve 31 when float 2 is elevated by a rise in the liquid level in the pan.

The operating connection between the float and rocker arm 35 comprises an extension 39 on the bottom of the float, said extension having a set screw 40 adjustable therethrough and adapted to impinge against a head 41 which is pivoted on the end of the rocker arm opposite the roller 37. After sounding of gong 4 and opening of valve 31 by the impingement of set screw 40 against head 41, the discharge of liquid through port 30 will again lower the liquid level in the drip pan so as to permit downward swinging of float 2, and consequent return of the parts to their normal inoperative position until the liquid level in the pan again rises to the predetermined level for causing sounding of the alarm.

In order that the valvular control for the auxiliary chamber may be removed with the latter from the drip pan, brackets 33 and 36 on which the valve operating mechanism is mounted, are supported by arm 25 which is fixed to casing 20.

The removable auxiliary chamber and its valvular control are adapted for use in connection with drip pans of different size, by providing for adjustment of the pivotal mountings for rocker arm 35 and lever 32. As an instance of this arrangement bracket 36 is vertically slidable in a tube 42 mounted on arm 25, and is fixed in adjusted position by a set screw 43; and lever 32 is slidably mounted in a guide 44 hinged to bracket 33, said lever being fixed in adjusted position by a set screw 45.

In order to properly aline valve 31 with port 30 when the valve operating mechanism is thus adjusted, the valve 31 is fixed to a guide 46 which is slidable on lever 32, the guide being held at the desired adjustment by a set screw 47.

The operating connection between float 2 and rocker arm 35 is also adjustable to permit use of the auxiliary liquid chamber with drip pans of different size, and for this purpose extension 39 is horizontally adjustable relative to the float by providing a slot 48 in said extension, with supporting bolts 49 received therein and extending through the bottom of the float.

It will thus be seen that I have provided a construction whereby the rise of the liquid level in drip pan 1 will elevate float 2 so as to sound gong 4, and said movement of the float will open valve 31 to permit discharge of liquid from the drip pan into the auxiliary chamber, the adjustment of screws 6 and 10 providing for sounding the gong at a predetermined liquid level.

It will be further noted that the adjustment of set screw 40 in connection with the adjustment of the rocker arm 35 and lever 32, provides for opening valve 31 when the liquid in the drip pan is at any desired level, in order to regulate the period of time during which the gong will be sounded; and the adjustment of rocker arm 35, lever 32, and extension 39 will adapt the removable auxiliary liquid chamber to drip pans of different size.

It will be apparent that various changes may be made in the construction, combination, and arrangement of parts as thus described, without departing from the spirit of the invention.

I claim:

1. An alarm for a receptacle comprising a float mounted on said receptacle, a gong on said receptacle, an operating connection between said float and gong for sounding the latter, means for adjusting said operating connection, and means for adjusting said gong on said receptacle.

2. An alarm for a receptacle comprising a liquid operated float, a gong operatively connected to said float, an auxiliary chamber removably supported in said receptacle, and a discharge from said receptacle to said auxiliary chamber adapted for the passage of liquid from said receptacle when the level thereof is raised so as to operate said float.

3. An alarm for a receptacle comprising a liquid operated float, a gong operatively connected to said float, an auxiliary chamber in said receptacle, an arm projecting from said auxiliary chamber, a port in said auxiliary chamber having a valvular control, actuating means for said valve supported by said arm, and an operating connection between said actuating means and said float.

4. An alarm for a receptacle comprising a liquid operated float, a gong operatively connected to said float, an auxiliary chamber in said receptacle, an arm projecting from said auxiliary chamber and detachably connected to said receptacle for removably securing said auxiliary chamber in said receptacle, a port in said auxiliary chamber having a valvular control, actuating means for said valve supported by said arm, and an operating connection between said actuating means and said float.

5. An alarm for a receptacle comprising a liquid operated float, a gong operatively connected to said float, an auxiliary chamber removably supported in said receptacle, a port in said auxiliary chamber having a valvular control, an operating connection between said float and said valve, and means for adjusting said operating connection relative to said receptacle.

6. An alarm for a receptacle comprising a liquid operated float, a gong operatively connected to said float, an auxiliary chamber removably supported in said receptacle, a port in said auxiliary chamber having a valvular control, an operating connection for said valve, an abutment on said float adapted to engage said operating connection for actuating the same, and means for laterally adjusting said abutment relative to said float.

In testimony whereof I have affixed my signature to this specification.

LOUIS MAILMAN.